(12) United States Patent
Hawkinson et al.

(10) Patent No.: US 11,785,999 B2
(45) Date of Patent: Oct. 17, 2023

(54) GARMENT WITH ADAPTIVE STAND-OFF FEATURES

(71) Applicant: NIKE, Inc., Beaverton, OR (US)

(72) Inventors: Karen A. Hawkinson, Portland, OR (US); Joshua Patrick Williams, Portland, OR (US)

(73) Assignee: NIKE, Inc., Beaverton, OR (US)

(*) Notice: Subject to any disclaimer, the term of this patent is extended or adjusted under 35 U.S.C. 154(b) by 145 days.

(21) Appl. No.: 17/225,638

(22) Filed: Apr. 8, 2021

(65) Prior Publication Data

US 2021/0361010 A1    Nov. 25, 2021

Related U.S. Application Data

(60) Provisional application No. 63/027,042, filed on May 19, 2020.

(51) Int. Cl.
  *A41D 31/12*    (2019.01)
  *A41D 13/05*    (2006.01)

(52) U.S. Cl.
  CPC ............ *A41D 31/125* (2019.02); *A41D 13/05* (2013.01)

(58) Field of Classification Search
  CPC ............................. A41D 31/125; A41D 13/05
  See application file for complete search history.

(56) References Cited

U.S. PATENT DOCUMENTS

| | | | |
|---|---|---|---|
| 2008/0075850 A1* | 3/2008 | Rock .................. | A41D 31/065 427/176 |
| 2008/0254263 A1 | 10/2008 | Yasui et al. | |
| 2013/0078415 A1* | 3/2013 | Rock .................. | D06N 3/14 28/169 |
| 2017/0071275 A1* | 3/2017 | Darby .................. | A41B 1/08 |
| 2017/0106622 A1* | 4/2017 | Bonin .................. | B32B 5/26 |
| 2017/0273377 A1* | 9/2017 | Aihara .................. | A41B 1/08 |
| 2019/0191800 A1* | 6/2019 | Aihara .................. | D06N 7/0092 |

(Continued)

FOREIGN PATENT DOCUMENTS

AT           9009 U1    4/2007

OTHER PUBLICATIONS

International Search Report and Written Opinion for PCT application No. PCT/US2021/027488, dated Jul. 22, 2021, 13 pages.

(Continued)

*Primary Examiner* — Khaled Annis
(74) *Attorney, Agent, or Firm* — SHOOK, HARDY & BACON L.L.P.

(57) ABSTRACT

Aspects herein are directed to garments that incorporate adaptive stand-off structures in the form of fluid-filled bladders that transition from a first shape to a second shape when exposed to moisture in the form of, for example, perspiration. When the fluid-filled bladders are in the first shape, the fluid-filled bladders are generally planar with a surface plane of a textile layer forming the garment so that the garment comes into contact or near contact with the wearer's body surface. When the fluid-filled bladders are in the second shape, they extend in a z-direction away from the surface plane of the textile layer forming the garment such that the textile layer is spaced apart from the wearer's body surface by the stand-off structures to reduce cling and facilitate the evaporation of perspiration.

20 Claims, 8 Drawing Sheets

(56) References Cited

U.S. PATENT DOCUMENTS

2021/0045477 A1\* 2/2021 Morgan ............... A41D 31/125
2021/0361010 A1\* 11/2021 Hawkinson .......... A41D 13/005

OTHER PUBLICATIONS

International Preliminary Report on Patentability received for PCT Patent Application No. PCT/US2021/027488, dated Dec. 1, 2022, 8 pages.

\* cited by examiner

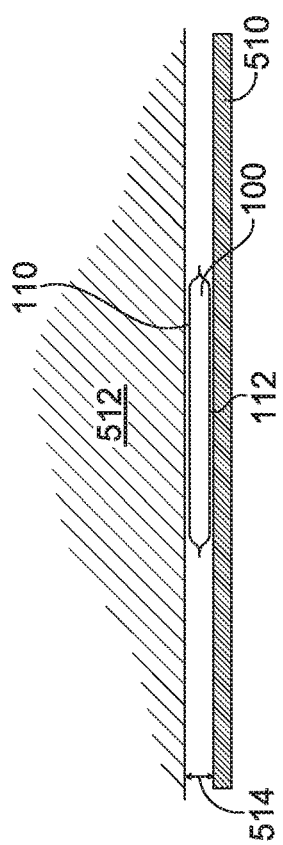
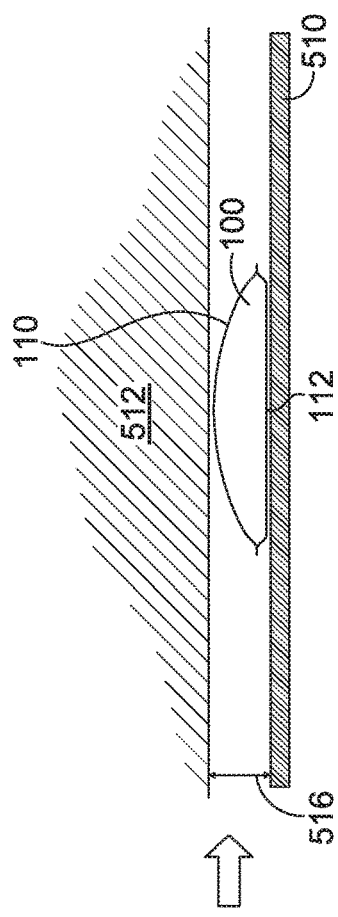
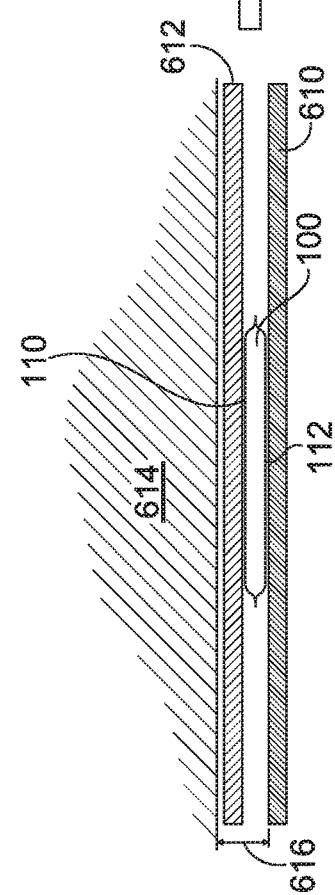
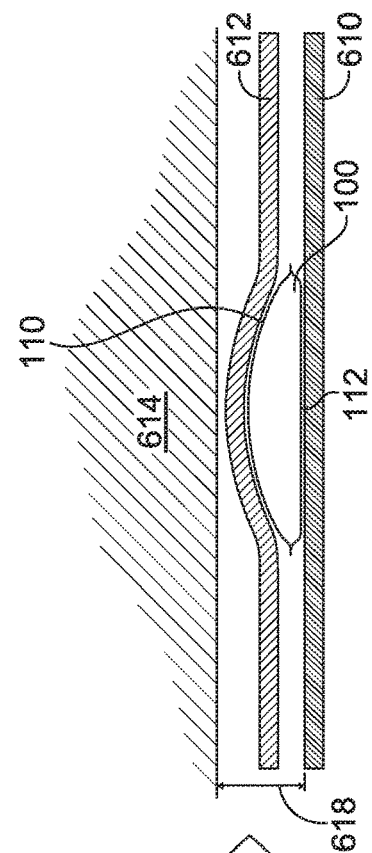

1300

1310 — SECURE A FLUID-FILLED BLADDER IN A SPACE BETWEEN A FIRST TEXTILE LAYER AND A SECOND TEXTILE LAYER, WHERE THE FLUID-FILLED BLADDER UNDERGOES A CHANGE IN DIMENSION IN AT LEAST A Z-DIRECTION TO CAUSE THE FLUID-FILLED BLADDER TO TRANSITION FROM A FIRST SHAPE TO A SECOND SHAPE

FIG. 13

GARMENT WITH ADAPTIVE STAND-OFF FEATURES

CROSS-REFERENCE TO RELATED APPLICATIONS

This application, titled "Garment with Adaptive Stand-Off Features," claims the benefit of priority of U.S. Prov. App. No. 63/027,042, filed May 19, 2020, and titled "Garment with Adaptive Stand-Off Features." The entirety of the aforementioned application is incorporated by reference herein.

TECHNICAL FIELD

Aspects herein are directed to a garment with adaptive stand-off features.

BACKGROUND

Traditional garments utilize static structures, such as spacers, to achieve a fixed level stand-off between the garment and a wearer's body surface.

SUMMARY

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are illustrative in nature and are not limiting.

Clause 1. A garment comprising: a textile layer; and a fluid-filled bladder secured to the textile layer, the fluid-filled bladder comprising: an inner layer facing an interior of the fluid-filled bladder, and an outer layer laminated to the inner layer and positioned external to the inner layer, the outer layer formed from a film material that undergoes a change in dimension in at least a z-direction when exposed to moisture to cause the fluid-filled bladder to transition from a first shape to a second shape.

Clause 2. The garment according to clause 1, wherein the first shape extends a first distance in the z-direction with respect to a surface plane of the textile layer, wherein the second shape extends a second distance in the z-direction with respect to the surface plane of the textile layer, and wherein the second distance is greater than the first distance.

Clause 3. The garment according to clause 2, wherein the second distance is from about 3.0 cm to about 4.0 cm.

Clause 4. The garment according to any of clauses 1 through 3, wherein the film material of the outer layer of the fluid-filled bladder comprises a thermoplastic polyester elastomer.

Clause 5. The garment according to clause 4, wherein the inner layer of the fluid-filled bladder is formed from a polyurethane film material.

Clause 6. The garment according to any of clauses 1 through 5, wherein the fluid-filled bladder further comprises an adhesive film layer positioned between the outer layer and the inner layer, the adhesive film layer used to adhere the outer layer to the inner layer.

Clause 7. The garment according to any of clauses 1 through 6, wherein the textile layer includes a first textile layer and a second textile layer positioned adjacent to the first textile layer to form a space therebetween.

Clause 8. The garment according to clause 7, wherein the fluid-filled bladder is secured in the space between the first textile layer and the second textile layer.

Clause 9. The garment according to any of clauses 7 through 8, wherein the second textile layer forms at least in part an innermost-facing surface of the garment.

Clause 10. A garment comprising: a first textile layer; a second textile layer positioned adjacent to the first textile layer to form a space therebetween, wherein the second textile layer forms at least in part an innermost-facing surface of the garment; and a fluid-filled bladder secured in the space between the first textile layer and the second textile layer, wherein the fluid-filled bladder undergoes a change in dimension in at least a z-direction when exposed to moisture to cause the fluid-filled bladder to transition from a first shape to a second shape.

Clause 11. The garment according to clause 10, wherein the fluid-filled bladder comprises: an inner layer facing an interior of the fluid-filled bladder, and an outer layer laminated to the inner layer and positioned external to the inner layer.

Clause 12. The garment according to clause 11, wherein the outer layer undergoes the change in dimension in the z-direction when exposed to moisture.

Clause 13. The garment according to any of clauses 11 through 12, wherein the inner layer does not undergo the change in dimension in the z-direction when exposed to moisture.

Clause 14. The garment according to any of clauses 11 through 13, wherein the outer layer is formed from a thermoplastic polyester elastomer.

Clause 15. The garment according to any of clauses 11 through 15, wherein the inner layer is formed from a polyurethane material.

Clause 16. A method of manufacturing a garment having a fluid-filled bladder, the method comprising: securing the fluid-filled bladder in a space between a first textile layer and a second textile layer that form the garment, wherein the second textile layer forms at least in part an innermost-facing surface of the garment, and wherein the fluid-filled bladder undergoes a change in dimension in at least a z-direction when exposed to moisture to cause the fluid-filled bladder to transition from a first shape to a second shape.

Clause 17. The method of manufacturing the garment having the fluid-filled bladder according to clause 16, wherein the second textile layer is a mesh textile.

The method of manufacturing the garment having the fluid-filled bladder according to any of clauses 16 through 17, wherein the second textile layer has moisture-wicking properties.

Clause 19. The method of manufacturing the garment having the fluid-filled bladder according to any of clauses 16 through 18, wherein the fluid-filled bladder comprises: an inner layer facing an interior of the fluid-filled bladder, and an outer layer laminated to the inner layer and positioned external to the inner layer, wherein the outer layer undergoes the change in dimension in the z-direction when exposed to moisture.

Clause 20. The method of manufacturing the garment having the fluid-filled bladder according to any of clauses 16 through 19, wherein the first shape extends a first distance in the z-direction with respect to a surface plane of at least the second textile layer, wherein the second shape extends a second distance in the z-direction with respect to the surface plane of the second textile layer, and wherein the second distance is greater than the first distance.

BRIEF DESCRIPTION OF THE DRAWINGS

Examples of aspects herein are described in detail below with reference to the attached drawing figures, wherein:

FIG. 5A illustrates the fluid-filled bladder of FIGS. 1A-1B secured to a textile layer and positioned adjacent to a body surface of a wearer in accordance with aspects herein;

FIG. 5B illustrates the fluid-filled bladder of FIG. 5A after being exposed to moisture in accordance with aspects herein;

FIG. 6A illustrates the fluid-filled bladder of FIGS. 1A-1B secured between a first textile layer and a second textile layer in accordance with aspects herein;

FIG. 6B illustrates the fluid-filled bladder of FIG. 6A after being exposed to moisture in accordance with aspects herein;

FIG. 13 illustrates a flow diagram of an example method of manufacturing a garment having a fluid-filled bladder in accordance with aspects herein.

DETAILED DESCRIPTION

Figure 1A:
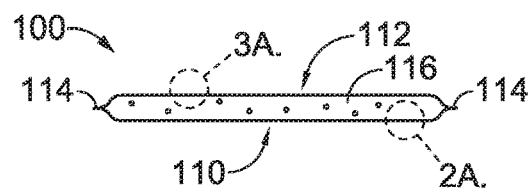
FIG. 1A illustrates a side view of a fluid-filled bladder before being exposed to moisture in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Traditional garments utilize static structures, such as spacers, to achieve a fixed level of stand-off between the garment and a wearer's body surface. While this may be useful when a wearer is exercising to reduce cling and to promote air circulation in the space between the garment and the wearer's body surface, maintaining a fixed level of stand-off may not be ideal when a wearer is at rest and a higher level of warmth/insulation is needed. Aspects herein are directed to garments and apparel items that incorporate adaptive stand-off structures that transition from a first shape to a second shape when exposed to moisture in the form of, for example, perspiration and/or precipitation. When the stand-off structures are in the first shape, the structures are generally planar with a surface plane of a textile layer forming the garment so that the garment comes into contact or near contact with the wearer's body surface. This may be useful when a wearer is at rest and extra warmth and/or insulation is needed. When the stand-off structures are in the second shape, they may extend in a z-direction away from the surface plane of the textile layer forming the garment and toward a body surface of a wearer such that the textile layer is spaced apart from the wearer's body surface by the stand-off structures. This not only reduces cling but promotes the circulation of air in the space between the textile layer and the wearer's body surface which facilitates the evaporation of perspiration and helps cool the wearer. The stand-off structures may also extend in a z-direction away from the surface plane of the textile layer forming the garment and toward an external environment where the stand-off structures may be used to redirect precipitation striking the garment.

In example aspects, the stand-off structures are in the form of one or more fluid-filled bladders secured to a textile layer forming the garment. The fluid-filled bladder is formed, at least in part, from a film material, such as a thermoplastic polyester elastomer, that undergoes a change in dimension in one or more of the z-direction, the x-direction, and the y-direction when exposed to moisture. The fluid-filled bladder may be partially filled with a fluid, such as air, and can act as an insulating structure when the fluid-filled bladder is in the first shape. When moisture, such as perspiration, contacts a surface of the fluid-filled bladder, the change in dimension of the film material causes the fluid-filled bladder to transition to the second shape which, for instance, creates stand-off between the garment and the wearer's body surface.

In some example aspects, to avoid the film material of the fluid-filled bladder from coming into direct contact with a wearer's body surface, the fluid-filled bladder may be positioned between a first textile layer and a second textile layer where the second textile layer forms an innermost-facing surface of the garment. To facilitate the exposure of the film material to perspiration produced by the wearer, the second textile layer may comprise a mesh textile having a large number of openings (engineered or inherently formed through a knitting or weaving construction) and/or a textile having moisture wicking properties.

It is further contemplated herein that the one or more fluid-filled bladders may be zonally located on the garment based on, for instance, heat or sweat maps of the human body. For example, heat and/or sweat maps indicate that a central back area of the human torso is a high heat and sweat producing area. As such, the fluid-filled bladders may be positioned at a central back area of an upper-body garment. In another example, the one or more fluid-filled bladders may be located on the garment in high cling areas such as the flank areas or the upper front chest area of the human torso. In yet another example, the one or more fluid-filled bladders may be located on the garment in areas subject to high amounts of rain exposure such as, for example, the shoulders and upper-back area of an upper-body garment. Any and all aspects, and any variation thereof, are contemplated as being within the scope herein.

As used herein, the term "garment" or "article of apparel" encompasses any number of products meant to be worn by a wearer including upper-body garments (e.g., shirts, jackets, hoodies, tank tops, pullovers), lower-body garments (e.g., pants, shorts, leggings), articles of footwear such as shoes or socks, articles of headwear (e.g., hats), gloves, sleeves (e.g., arm sleeves, calf sleeves), and the like. Positional terms used when describing the garment or article of apparel such as front, back, inner-facing surface, outer-facing surface, and the like are with respect to the garment or article of apparel being worn as intended with the wearer standing upright. As such, when the garment is in the form of an upper-body garment, the front of the upper-body garment is configured to cover, for instance, a front upper torso area and a front arm area (when the garment has sleeves), and the back of the upper-body garment is configured to cover a back upper torso area and a back arm area (when the garment has sleeves). When the garment is in the form of a lower-body garment, the front of the lower-body garment is configured to cover, for instance, a front lower torso area and a front leg area of the wearer, and the back of the lower-body garment is configured to cover a back lower torso area and a back leg area. Similarly, the inner-facing surface of the garment or article of apparel is configured to be positioned to face toward a body surface of a wearer. The term "innermost-facing surface" means the surface that is positioned closest to a wearer's body surface in relation to the other surfaces and/or layers of the garment or article of apparel. The term "outer-facing surface" of the garment or article of apparel is configured to face toward the external environment or away from the inner-facing surface of the article of apparel. The term "outermost-facing surface" means the surface that is positioned furthest away from a wearer's body surface in relation to the other surfaces and/or layers of the garment or article of apparel.

The term "surface plane" when used in relation to, for example, a textile layer or a surface of a fluid-filled bladder means a plane extending in an x-direction and a y-direction. The term "z-direction" means a direction that extends away from the respective surface plane in a positive or negative direction. Stated differently, the z-direction means a direction that is generally orthogonal to the respective surface plane. The term "fluid" when describing the fluid-filled bladder means a gas, including air, or a liquid. The term "about" as used herein means within ±10% of a referenced value. The term "moisture" as used herein means water in a vapor or liquid form, and other liquid substances including perspiration.

Aspects herein contemplate that at least one of the film materials forming the fluid-filled bladder may comprise a thermoplastic polyester elastomer (TPEE), and more specifically a poly-butylene terephthalate based (PBT-based) TPEE film that undergoes a change in dimension in one or more of the x-direction, y-direction, and z-direction when exposed to moisture. The TPEE film material and/or the PBT-based TPEE film material is configured to transport or diffuse moisture from one surface of the film to a second opposite surface of the film. The transport of the moisture may be facilitated by the presence of hydrophilic molecules (molecules that attract or have an affinity for water) within the film where a greater number of hydrophilic molecules may result in a greater transport of moisture. The movement of moisture through the film material may be measured using a water vapor transmission test such as ASTM E96 B, and in example aspects, the water vapor transmission rate of the film may be from about 600 $g/m^2/day$ to about 10,000 $g/m^2/day$, from about 1,000 $g/m^2/day$ to about 9,000 $g/m^2/day$, from about 3,000 $g/m^2/day$ to about 8,000 $g/m^2/day$, from about 5,000 $g/m^2/day$ to about 7,000 $g/m^2/day$, or about 6,000 $g/m^2/day$. An example PBT-based TPEE film is TPEE48 manufactured by Far Eastern New Century Corporation in Taipei, Taiwan. Additional film materials contemplated herein include a thermoplastic polyurethane (TPU) film material or variants thereof, a thermoplastic poly(ether-amide) elastomer (TPAE) film material, and/or any film material capable of transporting or diffusing moisture from one surface of the film material to a second opposite surface of the film material. Aspects herein contemplate the film material having a thickness from about 50 microns to about 70 microns. In general, this thickness range facilitates moisture being able to diffuse through the film material within a reasonable time frame (e.g., within one minute to one hour).

Unless otherwise noted, all measurements provided herein are measured at standard ambient temperature and pressure (25 degrees Celsius or 298.15 K and 1 bar) with the garment and/or article of apparel in a resting, un-tensioned state.

FIG. 1A depicts a side view of a fluid-filled bladder 100 before being exposed to a moisture stimulus where the fluid-filled bladder 100 comprises a first relatively flat shape. The fluid-filled bladder 100 includes a first surface 110 and a second surface 112 positioned opposite the first surface 110. In the first shape, a surface plane of the first surface 110 is substantially parallel (e.g., within ±20 degrees of parallel) and offset with respect to a surface plane of the second surface 112. The fluid-filled bladder 100 includes a perimeter edge 114 that demarcates where the film materials used to form the first surface 110 are joined to the film materials used to form the second surface 112 as explained further below with respect to FIG. 4. In example aspects, the fluid-filled bladder 100 is partially filled with a fluid 116 such as air. For instance, the fluid-filled bladder 100 may be filled from about 5% to about 60% of its maximum fill capacity where the maximum fill capacity is the volume of fluid contained within the fluid-filled bladder 100 at the point of rupture. Partially filling the fluid-filled bladder 100, as opposed to fully filling the fluid-filled bladder 100, allows the fluid-filled bladder 100 to change shape when exposed to a moisture stimulus.

Figure 1C:
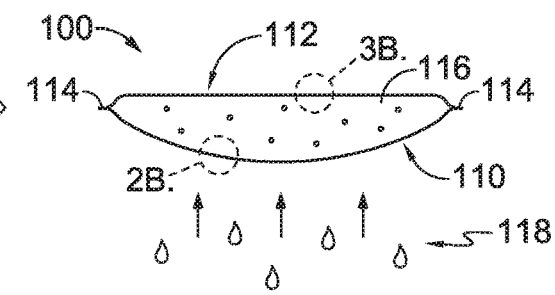
FIG. 1C illustrates a side view of the fluid-filled bladder of FIG. 1A after the first surface of the fluid-filled bladder is exposed to moisture in accordance with aspects herein.
Figure 1B:
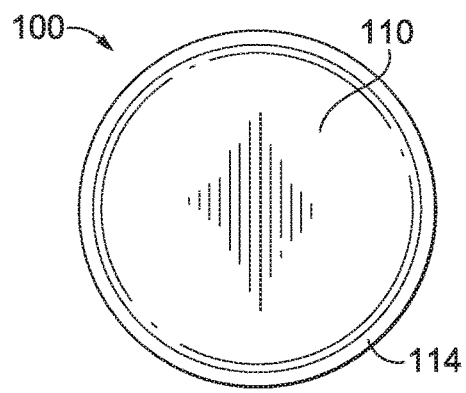
FIG. 1B illustrates a view of a first surface of the fluid-filled bladder of FIG. 1A before being exposed to moisture in accordance with aspects herein.

FIG. 1B depicts a view of the first surface 110 of the fluid-filled bladder 100 before being exposed to the moisture stimulus. The fluid-filled bladder 100 is shown in the form of a circle although other shapes are contemplated herein. The perimeter edge 114 extends around a circumference or perimeter of the fluid-filled bladder 100. In one example aspect, a diameter for the circle may be selected to achieve a desired amount of stand-off when the fluid-filled bladder 100 is in a second shape such as stand-off in the range of 3.0 cm to 4.0 cm. In example aspects, the diameter may be from about 5 cm to about 15 cm, from about 7 cm to about 12 cm, or about 10 cm.

Figure 1D:
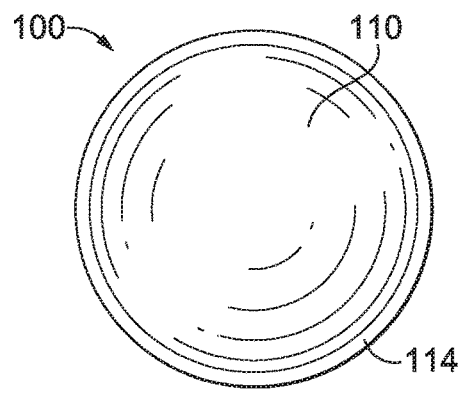
FIG. 1D illustrates a view of the first surface of the fluid-filled bladder of FIG. 1C after the first surface of the fluid-filled bladder is exposed to moisture in accordance with aspects herein.

FIG. 1C depicts a side view of the fluid-filled bladder 100 after the first surface 110 has been exposed to moisture 118 in the form of, for example, perspiration or precipitation, where the fluid-filled bladder 100 comprises the second shape. In the second shape, the surface plane of the first surface 110 is no longer parallel to the surface plane of the second surface 112. For instance, the first surface 110 may be convex while the second surface 112 may be substantially planar. FIG. 1D depicts a view of the first surface 110 of the fluid-filled bladder 100 after being exposed to the moisture 118 with the shading indicating the convexity of the first surface 110.

In one example aspect, when the fluid-filled bladder 100 is incorporated into a garment, the first surface 110 may be positioned adjacent to a body surface of a wearer. Moisture in the form of perspiration produced by the wearer may then contact the first surface 110 of the fluid-filled bladder 100 without contacting the second surface 112 of the fluid-filled bladder 100. The moisture 118 causes the film material forming the first surface 110 to undergo a change in dimension in one or more of the x-direction, the y-direction and the z-direction. By way of example, the first surface 110 may undergo a decrease in dimension in the x-direction and the y-direction and an increase in dimension in the z-direction. The change in dimension of the first surface 110 causes the first surface 110 to become convex in relation to the second surface 112 and the fluid 116 contained within the fluid-filled bladder 100 to redistribute to occupy the space created by the change in shape of the first surface 110. As explained further below, the change in shape from the first shape to the second shape can be used to space apart the garment from the wearer's body surface to reduce cling and promote the movement of air in this space.

In another example aspect, the first surface 110 may be positioned adjacent to an external environment when the fluid-filled bladder 100 is incorporated into a garment. Moisture in the form of precipitation may contact the first surface 110 of the fluid-filled bladder 100 without contacting the second surface 112 of the fluid-filled bladder 100. The moisture 118 causes the film material forming the first surface 110 to undergo a change in dimension in one or more of the x-direction, the y-direction and the z-direction. The change in dimension of the first surface 110 causes the first surface 110 to become convex in relation to the second surface 112 and the fluid 116 contained within the fluid-filled bladder 100 to redistribute to occupy the space created by the change in shape of the first surface 110. In this example, the change in shape from the first shape to the second shape may be used to redirect the flow of precipitation striking the garment.

Although moisture is described as only contacting the first surface 110 of the fluid-filled bladder 100, it is contemplated herein that moisture may contact both the first surface 110 and the second surface 112. For example, moisture in the form of perspiration may contact the first surface 110 when the first surface 110 is positioned adjacent to a body surface of a wearer, and precipitation may contact the second surface 112 when the second surface 112 is positioned to face an external environment. In this example, both the first surface 110 and the second surface 112 may transition to a convex shape where the first surface 110 creates stand-off between the garment and the wearer's body surface and the second surface 112 redirects the flow of precipitation striking the garment. When the moisture 118 in the form of perspiration or precipitation no longer contacts the first surface 110 and/or second surface 112 of the fluid-filled bladder 100, the fluid-filled bladder 100 transitions back to the relatively flat first shape where the surface plane of the first surface 110 is substantially parallel and offset with respect to the surface plane of the second surface 112.

Figure 2A:
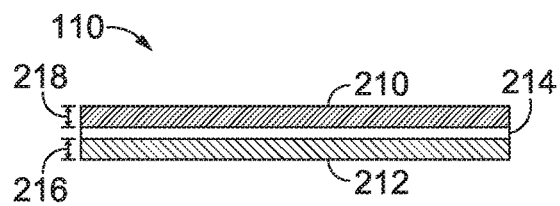
FIG. 2A illustrates a magnified view of the first surface of the fluid-filled bladder of FIG. 1A before the first surface of the fluid-filled bladder is exposed to moisture in accordance with aspects herein.
Figure 2B:
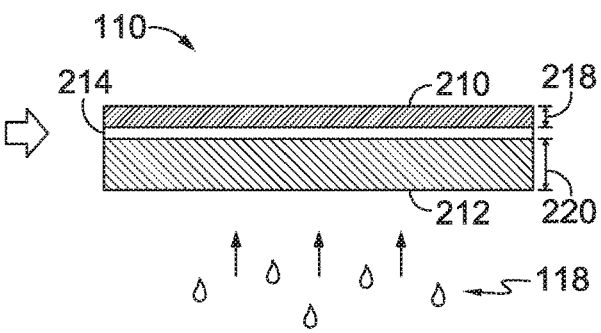
FIG. 2B illustrates a magnified view of the first surface of the fluid-filled bladder of FIG. 1C after the first surface of the fluid-filled bladder is exposed to moisture in accordance with aspects herein.

FIGS. 2A and 2B respectively depict a detailed view of the first surface 110 of the fluid-filled bladder 100 before and after being exposed to the moisture 118. With respect to FIG. 2A, the first surface 110 includes an inner layer 210 that is laminated to an outer layer 212 using an adhesive layer 214. The adhesive layer 214, in example aspects, may include a hot melt adhesive although other adhesives are contemplated herein. The inner layer 210 faces an interior of the fluid-filled bladder 100, and the outer layer 212 faces externally. When the fluid-filled bladder 100 is positioned within a garment, the outer layer 212 would, for example, face toward a body surface of a wearer and thus be exposed to moisture in the form of perspiration produced by the wearer. In example aspects, the inner layer 210 may be a polyurethane or a thermoplastic polyurethane film that does not undergo a change in dimension when exposed to, for example, moisture. In example aspects, the inner layer 210 may have a thickness 218 from about 50 microns to about 70 microns. The outer layer 212 may be the film material that transports or diffuses moisture from one surface of the film to a second opposite surface of the film such as a TPEE film or a PBT-based TPEE film. The outer layer 212 in FIG. 2A may have a first thickness 216 from about 40 microns to about 80 microns, from about 45 microns to about 75 microns, or about 50 microns to about 70 microns.

In FIG. 2B, the outer layer 212 is exposed to the moisture 118 in the form of perspiration and undergoes a change in dimension in at least the z-direction to a second thickness 220 where the second thickness 220 is greater than the first thickness 216. The outer layer 212 may also undergo a change in the x-direction and the y-direction (e.g., a decrease in the x-direction and the y-direction). As explained above, the change in dimension in the outer layer 212 causes the outer layer 212 to transition from a generally planar shape to more of a convex shape and the fluid-filled bladder 100 to transition from the first shape to the second shape.

Figure 3A:
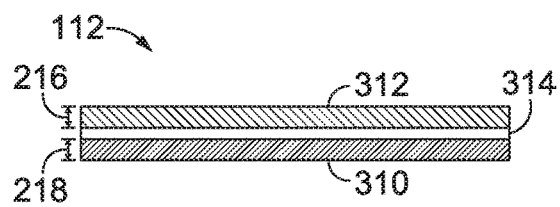
FIG. 3A illustrates a magnified view of a second surface of the fluid-filled bladder of FIG. 1A before the first surface of the fluid-filled bladder is exposed to moisture in accordance with aspects herein.
Figure 3B:
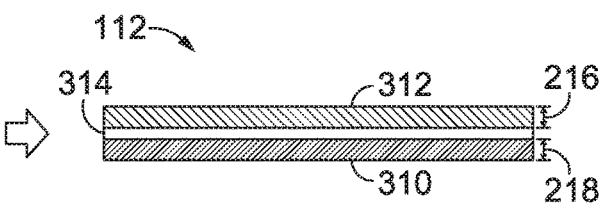
FIG. 3B illustrates a magnified view of the second surface of the fluid-filled bladder of FIG. 1C after the first surface of the fluid-filled bladder is exposed to moisture in accordance with aspects herein.

FIGS. 3A and 3B respectively depict a detailed view of the second surface 112 of the fluid-filled bladder 100 before and after the first surface 110 of the fluid-filled bladder 100 is exposed to the moisture 118. With respect to FIG. 3A, the second surface 112 includes an inner layer 310 that is laminated to an outer layer 312 using an adhesive layer 314. The adhesive layer 314 may include, for example, a hot melt adhesive although other adhesives are contemplated herein.

The inner layer 310 faces the interior of the fluid-filled bladder 100, and the outer layer 312 faces externally. When the fluid-filled bladder 100 is positioned within a garment, the outer layer 312 would face away from a body surface of a wearer. In example aspects, the inner layer 310 may be a polyurethane film or a thermoplastic polyurethane film that does not undergo a change in dimension when exposed to, for example, moisture. In example aspects, the inner layer 310 may have the thickness 218. The outer layer 312 may be the film material that transports or diffuses moisture from one surface of the film to a second opposite surface of the film such as a TPEE film or a PBT-based TPEE film. The outer layer 312 in FIG. 3A may have the first thickness 216. With respect to FIG. 3B, since the second surface 112 is not exposed to the moisture 118 in this example, there is generally not a change in dimension of the outer layer 312. As such, the outer layer 312 maintains the first thickness 216 after the fluid-filled bladder 100 is exposed to the moisture 118. Because there is not a change in dimension of the outer layer 312, the second surface 112 of the fluid-filled bladder generally maintains a planar shape before and after being exposed to the moisture 118.

Figure 4:
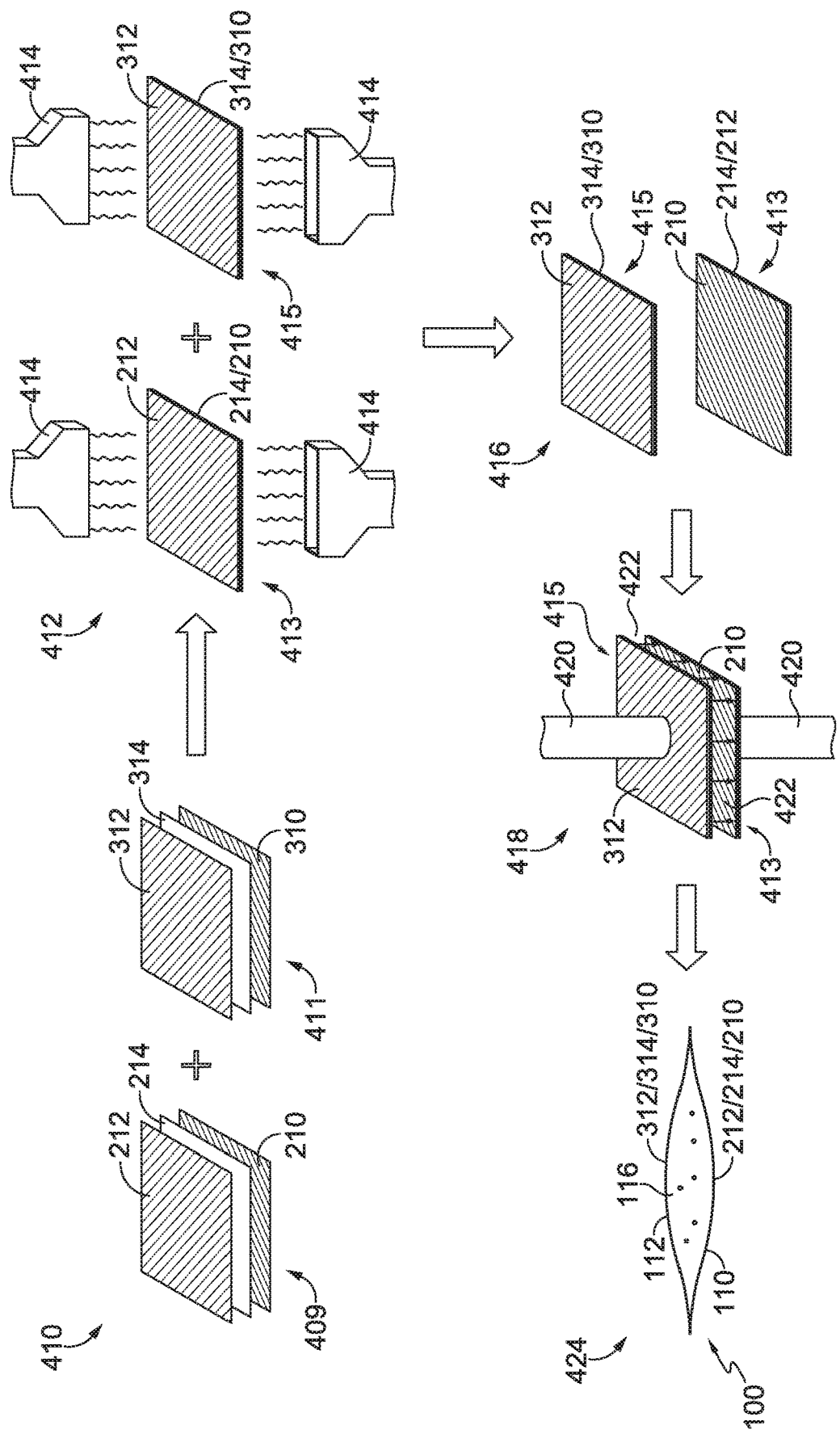
FIG. 4 illustrates a schematic of an example process for forming the fluid-filled bladder of FIG. 1A in accordance with aspects herein.

FIG. 4 illustrates a schematic of a process for forming the fluid-filled bladder 100. At a step 410, the layers forming the first surface 110 of the fluid-filled bladder 100 are stacked together to form a first stacked construction 409. For instance, the outer layer 212, the adhesive layer 214, and the inner layer 210 may be stacked together to form the first stacked construction 409. In an alternative aspect, the adhesive layer 214 may be included as part of the inner layer 210 in which case only two layers would be stacked together. At the same step 410, the layers forming the second surface 112 of the fluid-filled bladder 100 are stacked together to form a second stacked construction 411. For example, the outer layer 312, the adhesive layer 314, and the inner layer 310 may be stacked together to form the second stacked construction 411. In an alternative aspect, the adhesive layer 314 may be includes as part of the inner layer 310 in which case only two layers would be stacked together.

At a step 412, devices 414 are used to apply heat and/or pressure to one or more of the opposing surfaces of the first stacked construction 409 including the inner layer 210, the adhesive layer 214, and the outer layer 212. The heat and/or pressure causes the adhesive layer 214 to, for example, melt and secure the inner layer 210 to the outer layer 212 to form a first laminate construction 413. At the same step 412, the devices 414 apply heat and/or pressure to one or more of the opposing surfaces of the second stacked construction 411 including the inner layer 310, the adhesive layer 314, and the outer layer 312. The heat and/or pressure causes the adhesive layer 314 to, for example, melt and secure the inner layer 310 to the outer layer 312 to form a second laminate construction 415.

At a step 416, the first laminate construction 413 is stacked with the second laminate construction 415 such that the respective inner layers 210 and 310 are positioned adjacent to each other and the outer layers 212 and 312 face externally. At a step 418, devices 420 apply a vacuum to the first laminate construction 413 and the second laminate construction 415 where the vacuum forces are in opposing directions. At the same time, the perimeters edges of the first and second laminate constructions 413 and 415 are bonded together. More specifically, the perimeter edges of the respective inner layers 210 and 310 are bonded together. This may be done through, for example, a radio-frequency welder although other bonding techniques are contemplated herein. Bonding the perimeter edges together while maintaining the first and second laminate constructions 413 and 415 under vacuum ensures that a fluid, such as air, is trapped or sealed within the resulting fluid-filled bladder 100 as shown at step 424. The amount of vacuum produced by the devices 420 may be adjusted to ensure that the fluid-filled bladder 100 is filled to less than maximum fill capacity. For example, vacuum forces may be decreased to ensure the fluid-filled bladder 100 is only partially filled.

The steps depicted in FIG. 4 are just one example process for creating the fluid-filled bladder 100. In another example aspect, the fluid-filled bladder 100 may be formed with a two-way valve that enables a wearer to manually inflate and deflate the fluid-filled bladder 100. For example, the wearer would inflate the fluid-filled bladder 100 when stand-off or a change in shape is desired and deflate, or at least partially deflate, the fluid-filled bladder 100 when stand-off or a change in shape is no longer needed. Any and all aspects, and any variation thereof, are contemplated as being within aspect herein.

FIGS. 5A and 5B illustrate one example way of incorporating the fluid-filled bladder 100 into a garment. FIG. 5A illustrates the fluid-filled bladder 100 in the first relatively flat shape, and FIG. 5B illustrates the fluid-filled bladder 100 in the second shape after the first surface 110 is exposed to moisture. FIG. 5A illustrates the second surface 112 of the fluid-filled bladder 100 secured to a textile layer 510 using, for example, an adhesive, a hook-and-loop fastening system, and the like. Alternatively, the perimeter edges 114 of the fluid-filled bladder 100 may be secured to the textile layer 510 using bonding, stitching, an adhesive, and the like. In one example aspect, the fluid-filled bladder 100 may be removably attached to the textile layer 510 using, for instance, a releasable adhesive, hook-and-loop fasteners, and the like. In this example, the fluid-filled bladder 100 may be removed before washing the garment. The first surface 110 of the fluid-filled bladder 100 is positioned adjacent to a body surface 512 of a wearer. In example aspects, because the fluid-filled bladder 100 is generally flat, there is minimal stand-off between the textile layer 510 and the body surface 512 as indicated by a distance 514 such that the textile layer 510 is in contact or near contact (e.g., within about 10 mm or less) with the body surface 512 of the wearer. Stated differently, the fluid-filled bladder 100 extends in the z-direction by the distance 514 with respect to a surface plane of the textile layer 510. Having the textile layer 510 in contact or near contact with the wearer's body surface 512 may provide needed warmth when the wearer is at rest. Moreover, the fluid contained within the fluid-filled bladder 100 may serve an additional insulation function.

In FIG. 5B, perspiration produced by the wearer's body surface 512 causes the first surface 110 of the fluid-filled bladder 100 to change in dimension and assume a convex shape. The convex shape increases the level of stand-off between the textile layer 510 and the body surface 512 to a distance 516 that is greater than the distance 514. Stated differently, the fluid-filled bladder 100 extends in the z-direction by the distance 516 with respect to the surface plane of the textile layer 510. In example aspects, the distance 516 may be from about 1 cm to about 5 cm, from about 1.5 cm to about 4.5 com, from about 2 cm to about 4.25 cm, or about 3 cm to about 4 cm. The stand-off created by the fluid-filled bladder 100 may lessen the perception of cling and may also create a space between the body surface 512 and the textile layer 510 through which air can circulate causing the perspiration to evaporate and cooling the wearer.

FIGS. 6A and 6B illustrate another example way of incorporating the fluid-filled bladder 100 into a garment.

FIG. 6A illustrates the fluid-filled bladder 100 in the first shape, and FIG. 6B illustrates the fluid-filled bladder 100 in the second shape after the first surface 110 of the fluid-filled bladder 100 is exposed to moisture. FIG. 6A illustrates the fluid-filled bladder 100 positioned between a first textile layer 610 and a second textile layer 612. The second surface 112 of the fluid-filled bladder 100 is secured to the first textile layer 610 using, for example, an adhesive, a hook-and-loop fastening system, and the like. Alternatively, the perimeter edges 114 of the fluid-filled bladder 100 may be secured to the first textile layer 610 using bonding, stitching, an adhesive, and the like. In one example aspect, the fluid-filled bladder 100 may be removably attached to the first textile layer 610 using, for instance, a releasable adhesive, hook-and-loop fasteners, and the like. The first surface 110 of the fluid-filled bladder 100 is positioned adjacent to the second textile layer 612. The second textile layer 612 in this example is an innermost-facing surface of a garment and is in contact or near contact with a body surface 614 of a wearer. In example aspects, the first surface 110 of the fluid-filled bladder 100 is not secured to the second textile layer 612 such that the second textile layer 612 can move freely with respect to the first surface 110 of the fluid-filled bladder 100. Alternatively, the first surface 110 of the fluid-filled bladder 100 may be secured to the second textile layer 612 using one of the affixing technologies described herein.

The second textile layer 612, in example aspects, may include a mesh construction having a large number of closely spaced holes that are created by way of, for instance, a knitting or weaving process or through a post-weaving or knitting process such as by laser cutting, die cutting, and the like. The holes allow moisture produced by the body surface 614 of the wearer to contact the first surface 110 of the fluid-filled bladder 100. Additionally, or alternatively, the second textile layer 612 may include a moisture-wicking textile that transport moisture produced by the body surface 614 to the first surface 110 of the fluid-filled bladder 100. The transport mechanism may include denier differential, capillary action, a moisture-wicking finish, and the like. Use of a second textile layer 612 prevents direct contact of the first surface 110 of the fluid-filled bladder 100 with the body surface 614 which may improve wearer comfort.

In example aspects, because the fluid-filled bladder 100 is generally flat in the first shape and as shown in FIG. 6A, there is minimal stand-off between the first textile layer 610 and the body surface 614 as indicated by a distance 616 such that the first and second textile layers 610 and 612 are in contact or near contact with the body surface 614 of the wearer. Stated differently, the fluid-filled bladder 100 extends in the z-direction by the distance 616 with respect to a surface plane of the first textile layer 610. Having the first and second textile layers 610 and 612 in contact or near contact with the wearer's body surface 614 may provide needed warmth when the wearer is at rest. Moreover, the fluid contained within the fluid-filled bladder 100 may serve an additional insulation function.

In FIG. 6B, perspiration produced by the wearer's body surface 614 causes the first surface 110 of the fluid-filled bladder 100 to change in dimension and assume a convex shape. The convex shape increases the level of stand-off between the first textile layer 610 and the body surface 614 to a distance 618 that is greater than the distance 616. Stated differently, the fluid-filled bladder extends in the z-direction by the distance 618 with respect to the surface plane of the first textile layer 610. In example aspects, the distance 618 may be from about 1 cm to about 5 cm, from about 1.5 cm to about 4.5 com, from about 2 cm to about 4.25 cm, or about 3 cm to about 4 cm. The stand-off created by the fluid-filled bladder 100 may lessen the perception of cling and may also create a space between the body surface 614 and the first and/or second textile layers 610 and 612 through which air can circulate causing the perspiration to evaporate and cooling the wearer. With respect to both FIG. 5B and FIG. 6B, when the wearer stops perspiring, the fluid-filled bladder 100 returns to the relatively flat shape shown in FIGS. 5A and 6A and stand-off is decreased.

Figure 7A:
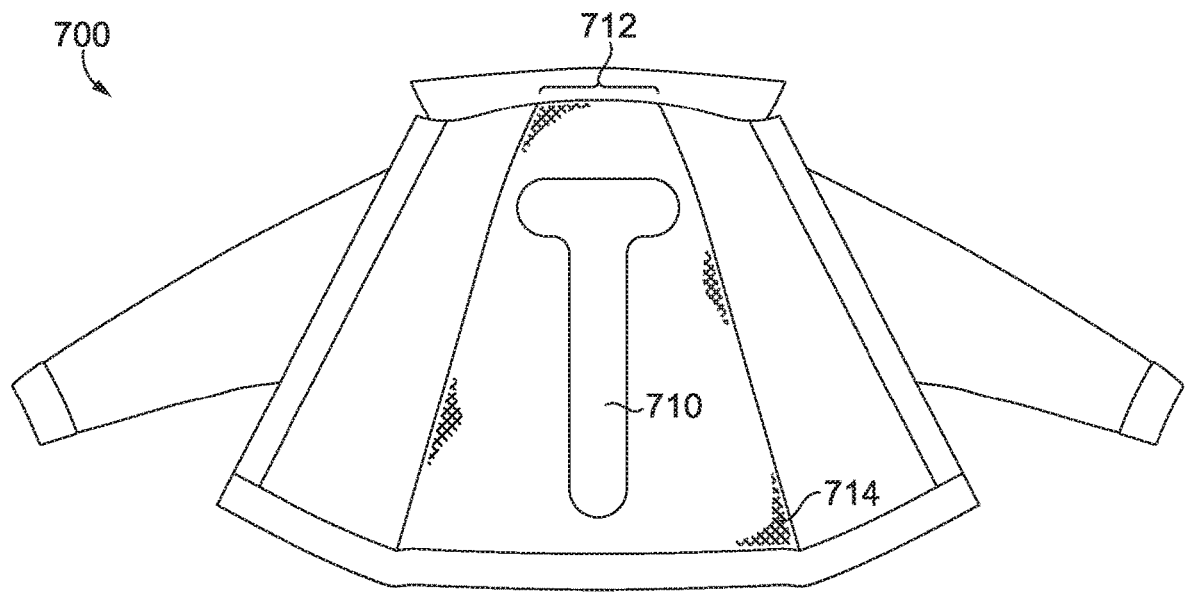
FIG. 7A illustrates an inner-facing surface of an upper-body garment having a first example fluid-filled bladder positioned at a back torso portion of the upper-body garment in accordance with aspects herein.

As mentioned, the fluid-filled bladder described herein may be zonally incorporated in a garment based on, for example, heat and/or sweat maps and/or rain contact maps of a human body. FIGS. 7A-9 illustrate some example configurations for the fluid-filled bladder described herein along with some example zonal locations. FIG. 7A illustrates an upper-body garment 700 in the form of a jacket. The upper-body garment 700 is shown in an open state such that the inner-facing surface of the upper-body garment 700 is visible. A fluid-filled bladder 710 in a T-shape is shown at a central back area 712 of the upper-body garment 700 where the arms of the T-shape are positioned adjacent to a neck opening of the upper-body garment 700 and the stem of T-shape is located adjacent to a waist opening of the upper-body garment 700. This location may be based on heat and/or sweat maps that indicate that the central back area 712 is a high heat and/or sweat-producing area of the human body. The fluid-filled bladder 710 may be positioned between two textile layers as shown in FIGS. 6A and 6B where the innermost-facing textile layer 714 includes, for example, a mesh construction as indicated by the cross-hatch shading.

It is contemplated herein, that different portions of the fluid-filled bladder may change shape independently of other portions of the fluid-filled bladder 710. By way of illustrative example, the arms of the fluid-filled bladder 710 may change from a shape where both surfaces of the fluid-filled bladder 710 are relatively planar with respect to each other to a shape where the surface of the fluid-filled bladder in contact with moisture assumes a convex shape while the stem of the fluid-filled bladder does not change shape. This may be due to differential perspiration production along the central back area of the wearer.

Figure 7B:
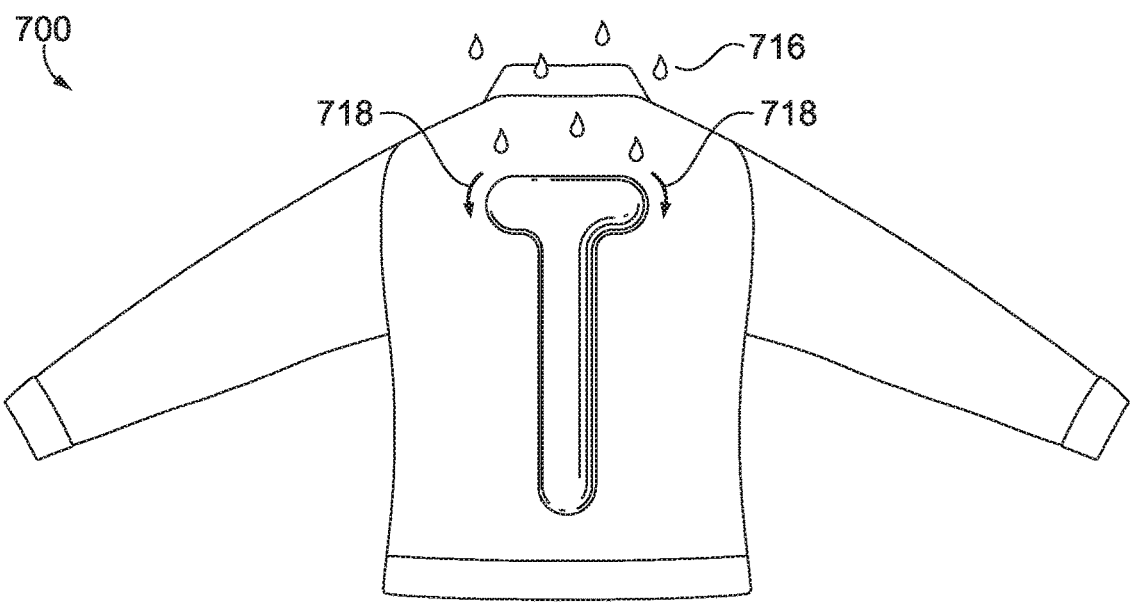
FIG. 7B illustrates a back view of the upper-body garment of FIG. 7A with the fluid-filled bladder redirecting precipitation in accordance with aspects herein.

FIG. 7B illustrates a back view of an outer-facing surface of the upper-body garment 700. Precipitation 716 is shown hitting the shoulders and upper-back area of the upper-body garment 700. The precipitation 716 may cause the surface of the fluid-filled bladder 710 that faces toward the external environment to transition from a relatively planar shape to a convex shape. The convex shape may act to redirect the precipitation 716 along the sides of the upper-body garment 700 as shown by the arrows 718. In this example, the material forming an outermost-facing surface or layer of the upper-body garment 700 may comprise a mesh construction or may possess a moisture-wicking characteristic to facilitate the movement of the precipitation 716 to the surface of the fluid-filled bladder 710.

Figure 8:
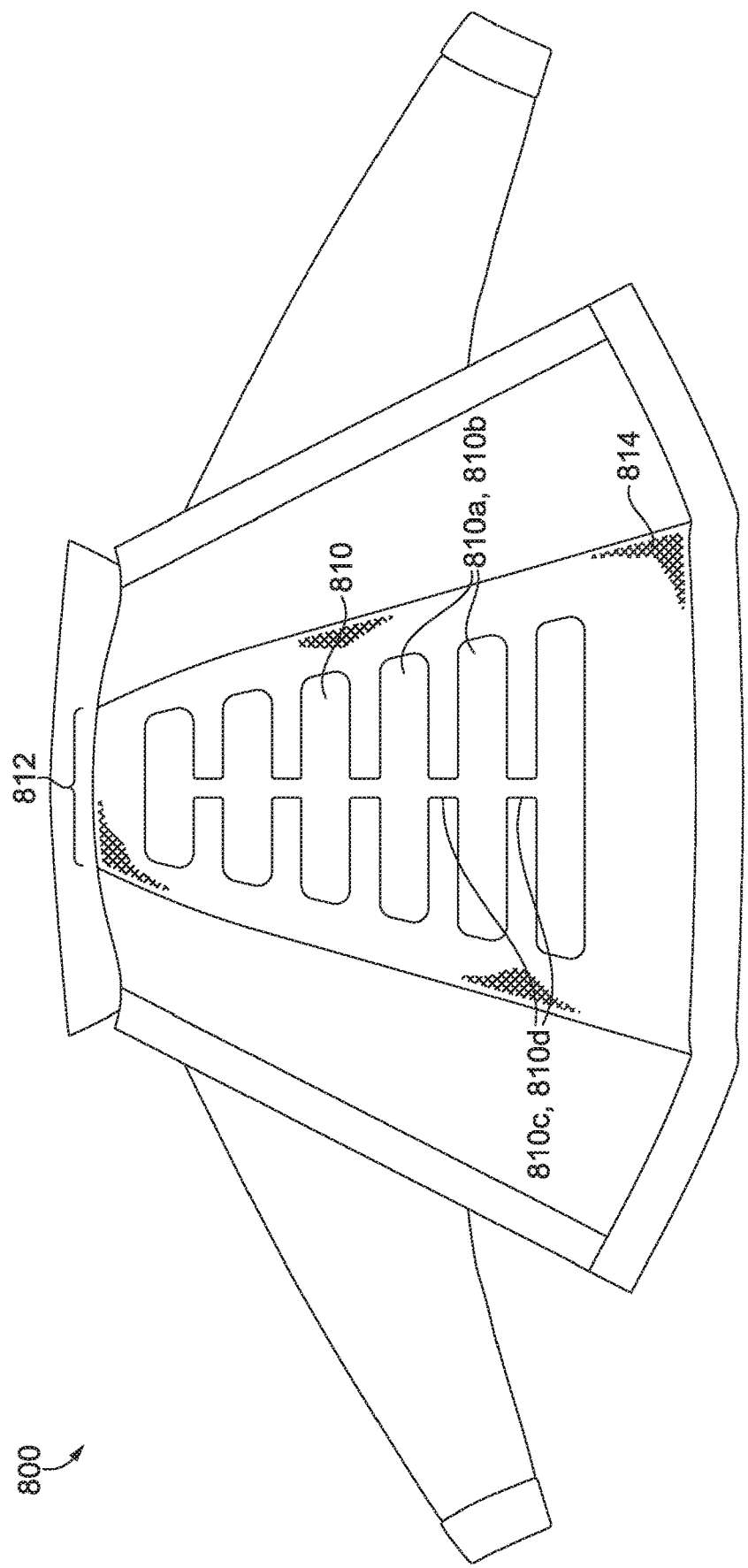
FIG. 8 illustrates an inner-facing surface of an upper-body garment having a second example fluid-filled bladder positioned at a back torso portion of the upper-body garment in accordance with aspects herein.

FIG. 8 illustrates another example upper-body garment 800 in an open state. A fluid-filled bladder 810 is positioned at a central back area 812 of the upper-body garment 800 and, in example aspects, is positioned between two textile layers where the innermost-facing textile layer 814 includes, for example, a mesh construction as indicated by the cross-hatch shading. The fluid-filled bladder 810 has a shape configuration including a number of bladder sections, such as bladder sections 810a and 810b connected by a number of conduit sections such as conduit sections 810c and 810d.

The conduit sections 810c and 810d may act as a conduit for fluid contained within the fluid-filled bladder 810 to move from one bladder section such as the bladder section 810a to another bladder section such as the bladder section 810b in response to a change in shape of a particular bladder section. Similar to the fluid-filled bladder 710, different bladder sections of the fluid-filled bladder 810 may change from a first shape to a second shape independently of other bladder sections of the fluid-filled bladder 810. Again, this may be due to differential perspiration production along the central back area of the wearer.

Figure 9:
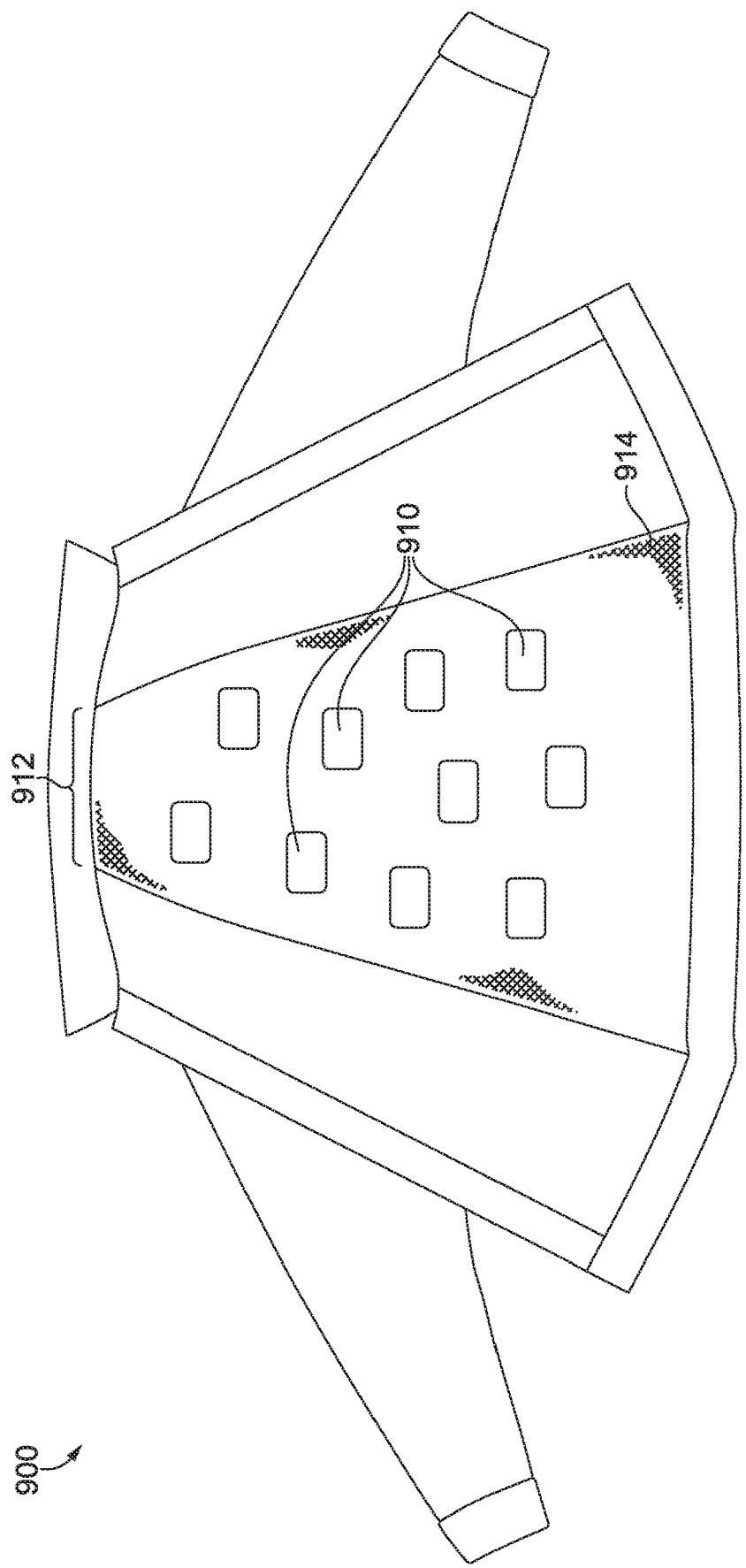
FIG. 9 illustrates an inner-facing surface of an upper-body garment having a plurality of fluid-filled bladders positioned at a back torso portion of the upper-body garment in accordance with aspects herein.

FIG. 9 illustrates yet another example upper-body garment 900 in an open state. A plurality of distinct and separate fluid-filled bladders 910 are positioned at a central back area 912 and, in example aspects, are positioned between two textile layers where the innermost-facing textile layer 914 may include, for example, a mesh construction. Based on differential perspiration production of the wearer, different fluid-filled bladders of the plurality of fluid-filled bladders 910 may change shape to produce stand-off in areas of sweat production while other fluid-filled bladders of the plurality of fluid-filled bladders 910 remain generally flat. The particular shape configuration and location of the fluid-filled bladders 710, 810, and 910 are illustrative, and it is contemplated that the fluid-filled bladders may have other shape configurations and may positioned at other locations on the garment to optimize stand-off where needed.

Figure 10:
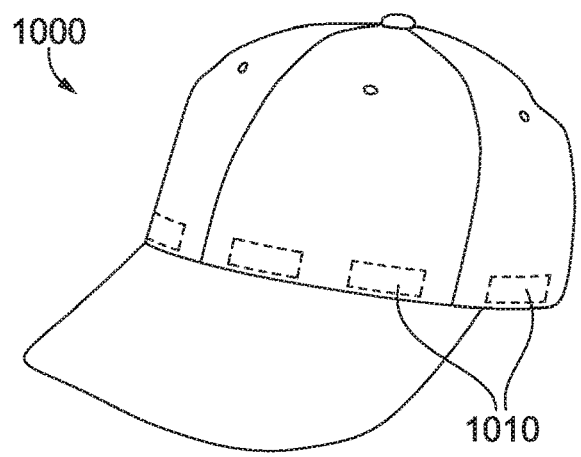
FIG. 10 illustrates an article of headwear having fluid-filled bladders positioned around a crown portion of the article of headwear in accordance with aspects herein.

The fluid-filled bladders described herein may be incorporated into other types of garments and articles of apparel. For example, FIG. 10 illustrates an article of headwear 1000 in the form of a hat. A series of fluid-filled bladders 1010 are positioned around a lower edge of the crown of the article of headwear 1000. When a wearer perspires, the fluid-filled bladders 1010 may change from a relatively flat shape to a convex or partially convex shape to produce stand-off between the article of headwear 1000 and the wearer's head thereby improving wearer comfort.

Figure 11:
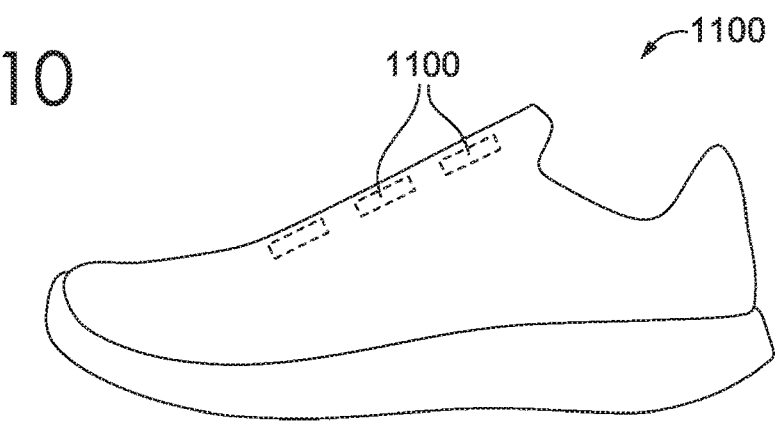
FIG. 11 illustrates an article of footwear having fluid-filled bladders positioned at a tongue portion of an upper in accordance with aspects herein.

FIG. 11 illustrate an article of footwear 1100 in the form of a shoe. One or more fluid-filled bladders 1110 are positioned in a tongue area of the upper of the article of footwear 1100. In response to perspiration from the wearer's foot, the fluid-filled bladders 1110 may transition to a more convex shape and create stand-off in this area to improve wearer comfort and facilitate air circulation within the article of footwear 1100. The location of the fluid-filled bladders 1110 is illustrative, and other locations on the article of footwear 1100 are contemplated herein.

Figure 12:
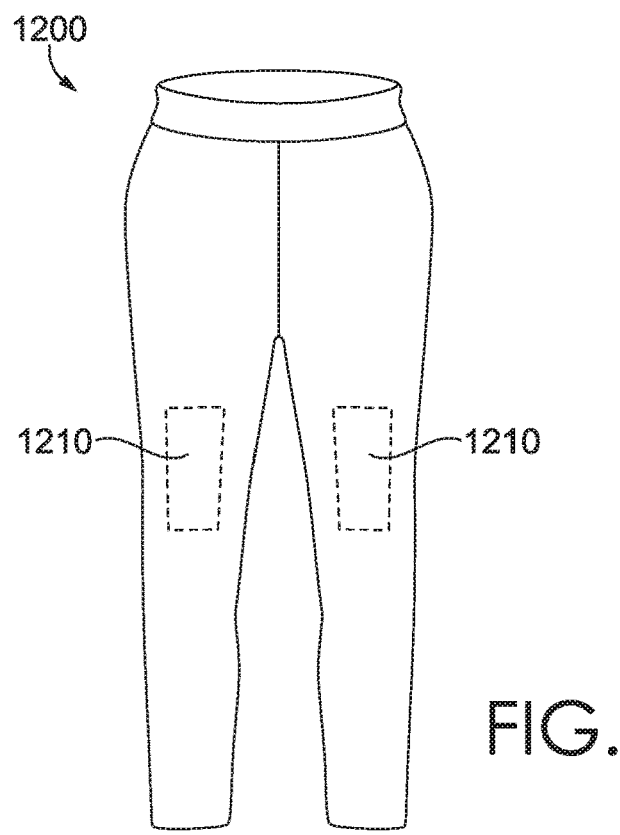
FIG. 12 illustrates a lower-body garment having fluid-filled bladders positioned at an anterior leg portion in accordance with aspects herein.

FIG. 12 illustrates a lower-body garment 1200 in the form of a pant. Although shown as a pant, the lower-body garment 1200 may be in the form of a short, a tight, a capri, and the like. The lower-body garment 1200 includes fluid-filled bladders 1210 positioned at an anterior thigh area of the leg portions of the lower-body garment 1200. This location is illustrative, and it is contemplated that the fluid-filled bladders 1210 may be positioned at other locations on the lower-body garment 1200 based on, for example, heat and/or sweat maps and/or rain contact maps of the human body. In response to perspiration produced by the wearer, the fluid-filled bladders 1210 transition from a first shape to a second shape to produce stand-off in areas where they are located.

FIG. 13 illustrates a flow diagram of an example method of manufacturing a garment having a fluid-filled bladder and is referenced generally by the numeral 1300. At a step 1310, a fluid-filled bladder, such as the fluid-filled bladder 100, is secured in a space between a first textile layer and a second textile layer that form the garment. The first and second textile layers may include the first and second textile layers 610 and 612 of FIGS. 6A and 6B. In example aspects, the second textile layer forms an innermost-facing surface of the garment. The fluid-filled bladder is at least partially formed of a film material that undergoes a change in dimension in at least a z-direction when exposed to moisture to cause the fluid-filled bladder to transition from a first, relatively flat shape to a second shape. In the second shape, the surface of the fluid-filled bladder that has been exposed to moisture transitions to a convex shape that produces stand-off between the first and second textile layers and a wearer's body surface.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A garment comprising:
a textile layer; and
a fluid-filled bladder secured to the textile layer, the fluid-filled bladder comprising:
an inner layer facing an enclosed interior cavity of the fluid-filled bladder, and
an outer layer laminated to the inner layer and positioned external to the inner layer, the outer layer comprising a film material that undergoes a change in dimension in at least a z-direction when exposed to moisture to cause the fluid-filled bladder to transition from a first shape to a second shape.

2. The garment of claim 1, wherein the first shape extends a first distance in the z-direction with respect to a surface plane of the textile layer, wherein the second shape extends a second distance in the z-direction with respect to the surface plane of the textile layer, and wherein the second distance is greater than the first distance.

3. The garment of claim 2, wherein the second distance is from about 3.0 cm to about 4.0 cm.

4. The garment of claim 1, wherein the film material of the outer layer of the fluid-filled bladder comprises a thermoplastic polyester elastomer.

5. The garment of claim 4, wherein the inner layer of the fluid-filled bladder comprises a polyurethane film material.

6. The garment of claim 5, wherein the fluid-filled bladder further comprises an adhesive film layer positioned between the outer layer and the inner layer, the adhesive film layer used to adhere the outer layer to the inner layer.

7. The garment of claim 1, wherein the textile layer includes a first textile layer and a second textile layer positioned adjacent to the first textile layer to form a space therebetween.

8. The garment of claim 7, wherein the fluid-filled bladder is secured in the space between the first textile layer and the second textile layer.

9. The garment of claim 7, wherein the second textile layer forms at least in part an innermost-facing surface of the garment.

10. A garment comprising:
a first textile layer;
a second textile layer positioned adjacent to the first textile layer to form a space therebetween, wherein the second textile layer forms at least in part an innermost-facing surface of the garment; and
a fluid-filled bladder comprising an enclosed interior cavity and secured in the space between the first textile layer and the second textile layer, wherein the fluid-filled bladder undergoes a change in dimension in at least a z-direction when exposed to moisture to cause the fluid-filled bladder to transition from a first shape to a second shape.

11. The garment of claim 10, wherein the fluid-filled bladder comprises:
an inner layer facing the enclosed interior cavity of the fluid-filled bladder, and
an outer layer laminated to the inner layer and positioned external to the inner layer.

12. The garment of claim 11, wherein the outer layer undergoes the change in dimension in the z-direction when exposed to moisture.

13. The garment of claim 12, wherein the inner layer does not undergo the change in dimension in the z-direction when exposed to moisture.

14. The garment of claim 11, wherein the outer layer comprises a thermoplastic polyester elastomer.

15. The garment of claim 11, wherein the inner layer comprises a polyurethane material.

16. The garment of claim 4, wherein the film material of the outer layer of the fluid-filled bladder comprises polybutylene terephthalate.

17. The garment of claim 1, wherein the film material of the outer layer of the fluid-filled bladder comprises a thermoplastic polymer capable of transporting or diffusing moisture from a first surface of the film material to a second opposite surface of the film material.

18. The garment of claim 1, wherein the inner layer is joined to a second layer around a perimeter edge that surrounds the enclosed cavity.

19. The garment of claim 18, wherein the second layer comprises a second inner layer facing the enclosed cavity.

20. The garment of claim 19, wherein the second layer further comprises a second outer layer laminated to the second inner layer and positioned external to the second inner layer, the second outer layer comprising a film material that undergoes a change in dimension in at least a z-direction when exposed to moisture.

* * * * *